Feb. 1, 1955 — R. E. CLAYTON, JR., ET AL — 2,701,221
TRIPLY LAMINATED RUBBER STRUCTURE
Filed April 2, 1952
Robert E. Clayton Jr. }Inventors
Robert M. Thomas
By W. H. Smyers  Attorney United States Patent Office 2,701,221
Patented Feb. 1, 1955

2,701,221

TRIPLY LAMINATED RUBBER STRUCTURE

Robert E. Clayton, Jr., Roselle Park, and Robert M. Thomas, Westfield, N. J., assignors to Standard Oil Development Company, a corporation of Delaware Application April 2, 1952, Serial No. 280,146

7 Claims. (Cl. 154—46)

This invention pertains to novel bonding methods for forming strong adherent bonds between dissimilar polymer compounds and to cement compositions and plies especially adapted for use as bonding materials.

In a variety of operations to produce plastic, rubbery and/or elastic type structures, it is frequently desirable to make one portion of the article from one kind of plastic or rubbery material, and the other portion from some other kind of plastic or rubber substance; hence, it becomes necessary that these two different compositions should be firmly bonded to each other. It is of particularly great importance to bond together chemically dissimilar materials.

As a specific example of this type of bond between dissimilar rubbery materials, in the production of pneumatic tires containing more than one polymer type, it is necessary to form an adequate and firm bond between treads or sidewalls prepared from relatively low unsaturation isoolefin-multiolefin copolymers and the more highly unsaturated rubbery materials such as the diene-styrene copolymers, diene-nitrile copolymers, and natural rubber, and other unsaturated polymers and mixtures of such rubbery materials from which the carcass is prepared.

However, natural rubber, rubber substitutes, and the various synthetic rubbery materials differ so greatly in their chemical and phyical properties and in their respective reactions to compounding, filling and vulcanizing agents and processes generally, that it is difficult to get dissimilar plastic and/or rubbery substances to adhere together in a union, joint, or weld. The adhesion may be negligible or the bond formed may be too weak to be useful.

Since it has often been desired to vulcanize the low unsaturation isoolefin-diolefin copolymers in contact with natural rubber, this problem of bonding is of especial importance. For example, the low unsaturation isoolefin-diolefin copolymer rubber is desired as a tire recapping material because of its outstanding resistance to aging, cracking and cutting. It is well known to the trade, however, that attempts to vulcanize the low unsaturation copolymer rubber in contact with vulcanized or unvulcanized natural rubber have failed. The surface of the copolymer compound which is in contact with the natural rubber compound does not vulcanize sufficiently. Therefore, the two rubbers may be easily separated at the weak bond formed. For example, in tires, low unsaturation copolymer rubber recaps pulled loose from natural rubber tire casings after a very few miles (of operation of the vehicle), sometimes as few as five miles. Up to now, no satisfactory solution has been found for this bonding problem.

It has been customary to use interposed plies of mixtures of the respective rubber-like compounds which are to be plied or combined together, and some kinds of rubber are readily united in this way. However, mixtures of natural rubber with the isoolefin-diolefin interpolymer are of relatively low physical strength, and while such a mixed ply will serve for some purposes, the strength is undesirably low for other purposes, especially for the attaching of a low unsaturation, olefinic synthetic polymer tread to a rubber tire carcass compounded from natural rubber or diene-styrene polymers or admixtures thereof.

It has been discovered that very good bonding of the low unsaturation isoolefin-diolefin copolymer rubbers to natural rubbers and the like is obtained by the use of a prevulcanized intermediate ply of the low unsaturation isoolefin-diolefin copolymer, and certain cements to be hereinafter disclosed to bond said intermediate ply to the surfaces to be joined.

This new ply or tie gum bond is especially useful for bonding together layers or portions of natural rubber or highly unsaturated synthetic rubbers and an isoolefin-diolefin low-temperature interpolymer.

One low unsaturation synthetic rubber-like substance which has found wide commercial use is the low-unsaturation interpolymer of a major proportion of an isoolefin and a minor proportion of a diolefin, particularly isobutylene with a diolefin such as butadiene, isoprene, the pentadienes, the methyl pentadienes, or dimethyl butadiene, the interpolymer being prepared by mixing the isoolefin and diolefin at a low temperature, and polymerizing the mixture to produce polymers having Staudinger molecular weights in excess of 20,000 and molecular weights preferably ranging between 30,000 and 150,000. These may be made as described in U. S. Patent 2,356,128. These low unsaturation copolymers have generally become known in the trade as GR–I synthetic rubbers.

Other valuable synthetic rubber-like polymers are those of dienes such as butadiene, or butadiene with acrylonitrile or butadiene with styrene as are produced by emulsion polymerization. These polymers, as well as natural rubber, have Wijs iodine numbers ranging up to about 451 and are herein designated as high unsaturation materials. This is in contrast to the isoolefin-diolefin polymers above described which normally have Wijs iodine numbers within the range of 1 up to about 40 or 50, and can be generally classified as low unsaturation materials.

These synthetic polymers as well as natural rubber can be cured by heating with sulfur, especially in the presence of specific organic accelerators which act as vulcanization aids. However, the conditions for curing the various polymers and rubbery materials differ a great deal. In particular, the rate of cure and curing temperature of the isoolefin-diolefin interpolymer differ widely from those of natural rubber, and from the emulsion polymerizates which more closely resemble natural rubber. Accordingly, the entire processes for the cure of these polymers, and for the vulcanization of rubber are quite different, and attempts to cause bodies of the respective materials to adhere by curing them in simple contact or by the use of simple cements or tie gums do not give useful bonds.

Sulfur bridges are formed during vulcanization. These may occur between molecules or between points of unsaturation in the same molecule. Natural rubber, for example, is considered as 100% unsaturated while isoolefin-diolefin copolymers have unsaturation of the order of 1.5%. A sulfur molecule would thus be more likely to form an intra- and/or inter-molecular linkage with natural rubber than cross-link between the natural rubber and copolymer molecules to form a stable bond. Furthermore, the solubility of sulfur is of the order of three times more in natural rubber than in isoolefin-diolefin copolymers.

Bonds are produced by the present invention by the use of a prevulcanized rubber intermediate ply made of the low unsaturation isoolefin-diolefin copolymer the ply being interposed between natural rubber and the low unsaturation copolymer and bonded thereto with special cements.

Although, the essence of bonding the low unsaturation rubber to natural rubber lies in the use of an intermediate strip or ply of the prevulcanized low unsaturation rubber, the effectiveness of the cements employed to bond the prevulcanized ply to the respective rubbers is also important. The tables below give the composition of the natural rubber cement applied to the natural rubber carcass and the GR–I prevulcanized tie strip as well as the GR–I cement applied to the GR–I rubber tread and to the GR–I prevulcanized tie strip. The unusual effectiveness of these cements after vulcanization is shown by the fact that the splitting which occurred while determining bond strengths was in the rubbery materials themselves and not in the bonds formed by the cements. Bond strengths at 77° F. varied from 37 to 47 lbs. per linear inch and at 250° F. from 15 to 34 lbs. These values are two to three times higher than the bond strengths shown, for example, in U. S. Patent 2,541,550 where 15 to 18 lb. values were obtained for bonds between GR–I rubber and neoprene using for the bond mixtures of the two rubbery materials as a simple cement.

The accompanying figure shows a cross-section view of a laminated structure according to the present invention.

A typical GR–I (low unsaturation isoolefin-diolefin copolymer) cement composition is shown below in Table 1 together with a typical natural rubber cement composition although it is not intended to limit the invention thereto.

TABLE 1

*Cement recipes*

| GR–I Cement | Parts by wt. | Natural Rubber Cement | Parts by wt. |
|---|---|---|---|
| Component: | | Component: | |
| GR–I | 100 | Smoked Sheet | 100 |
| SRF Black (furnace carbon black) | 50 | Stearic Acid | 1 |
| | | Bentonite | 10 |
| Zinc Oxide | 10 | Zinc Oxide | 10 |
| Sulfur | 3 | Sulfur | 2 |
| Tetramethylthiuram disulfide | 1 | Benzothiazyl disulfide | 1 |
| Mercaptobenzothiazole | 0.5 | | |
| | 164.5 | | 124 |
| Hexane | 750 | Hexane | 845 |
| | | Bondogen [1] | 2.1 |
| Solids, Wt. Percent | 18 | Solids, Wt. Percent | 12.8 |

[1] An oil-soluble sulfonic acid of high molecular weight with a hydrophobic alcohol of high boiling point—used to obtain higher solids content for a given viscosity or a lower vicosity for a given weight of solids.

Although the cement formulations shown in Table 1 are the preferred ones, certain modifications can be made in the recipes.

In the GR–I cement, the base polymer may be varied somewhat, depending on the precise type of GR–I being bonded. In general, the variation in type of copolymer depends on the amount (concentration) of diolefin used in the isobutylene-diolefin feed mixture which is subjected to polymerization.

It is generally preferred to use furnace carbon blacks and proportions of from 25 to 50 parts can be used per part of copolymer in the cement. Neither channel carbon black or furnace carbon black have proven to be satisfactory in these cements. From 5 to 10 parts of zinc oxide can be used. The combinations of accelerators which may be used are shown in the following table:

| Component | Parts by weight | | | | | |
|---|---|---|---|---|---|---|
| Sulfur | 3 | 3 | 3 | 2 | 2 | 2 |
| Tetramethylthiuram disulfide | 1 | --- | 0.5 | 2 | --- | 1 |
| Tellurium diethyl dithiocarbamate | --- | 1 | 0.5 | --- | 2 | 1 |
| Benzothiazyl disulfide | Plus 0.5 or 1 part of either of these or 0.5 part of both. | | | | | |
| Mercaptobenzothiazole | | | | | | |

In most cases the cement used to bond the natural rubber must be made by a more carefully controlled recipe. The stearic acid can be used in concentration of from 0.5 to 1%. The bentonite can be omitted or can be used in concentrations of from 0–15 parts by weight. It is best to omit carbon black altogether since neither furnace nor channel carbon blacks in concentrations of 10 to 75 parts by weight give satisfactory results. The zinc oxide can be used in concentration of 5 to 10 parts. Only slight variations of the accelerators should be used. The following changes in the basic recipe may be made:

| Component | Parts by weight | |
|---|---|---|
| Sulfur | 1.8–3.0 | 1.8–3.0 |
| Benzothiazyl disulfide | 1.2–0.8 | --- |
| Mercaptobenzothiazole | --- | 1.2–0.8 |

The cements are made up by compounding the appropriate polymer into suitable recipes such as the representative ones above using a rubber mill for the blending operations. These cements are especially satisfactory for producing bonds between low unsaturation isoolefin-diolefin copolymers and natural rubber and to butadiene-styrene copolymers as well as to mixtures thereof. The cements should be smooth, i. e., not containing lumps, gel or ropiness. They should be capable of flowing well into buffing depressions, at least with the aid of a stippling brush. The use of the interposed prevulcanized ply of GR–I is also necessary for the production of these novel bonds. Variations in the components of the recipes are possible.

The compounded cement recipes can be mixed with a solvent if desired which may be any solvent capable of dissolving or dispersing the rubbery dry polymer but which possesses some volatility properties. The straight chain and branched chain paraffin hydrocarbons have been found to be especially useful as solvents. Or a solvent such as benzene, toluene, petroleum naphtha or suitable chlorinated hydrocarbons may be used. Hexane is a good solvent which may be employed for preparing the cements of this invention. If other materials are used in the compounding recipe, such inorganic materials as zinc oxide and carbon black may be insoluble. In any case, either a solution, or a partial solution, or a dispersion may be prepared and used. A mixture containing about 6 up to 30% by weight of solids can be prepared and used.

The interposed prevulcanized tie ply of the low unsaturation isoolefin-diolefin copolymer which is an essential part of this invention can be made according to the customary well-known procedures of the preparation of these copolymers. Their preparation and properties are particularly well described in U. S. 2,356,128. In general, the copolymer used for the prevulcanized ply should be approximately the same composition as the low unsaturation copolymer material being bonded. In some cases, a copolymer ply made from a copolymer having somewhat increased amounts of diolefin in the feed may be employed to advantage, since the somewhat higher unsaturation tends to improve the bonding of the prevulcanized strip to the natural rubber or GR–S.

By "prevulcanized" it is meant that the ply strip is vulcanized enough so that it may be buffed or sanded, and also vulcanized enough to have a sufficient start so that the natural rubber cannot prevent it from vulcanizing adequately when natural rubber is placed in contact with the strip. Yet it should be vulcanized somewhat less than to an optimum cure so that when it is later subjected to heat and pressure during the vulcanization of the rubbers to be bonded to it, the strip will not be excessively vulcanized.

The composition of the prevulcanized ply is critical. The permitted variations on the composition of this isoolefin-diolefin tie strip is shown as follows:

*GR–I prevulcanized tie strip*

| Component: | Parts by weight |
|---|---|
| GR–I | 100 |
| SRF Carbon Black | 45–55 |
| or | |
| HMF Carbon Black | 40–50 |
| Hydrocarbon mixture (plasticizer) | 5–15 |
| Sulfur | 2–3 |
| Tetramethylthiuram disulfide | 1–2 |
| Mercaptobenzothiazole | 0.5–1 |
| Benzothiazyl disulfide | 0.5–1 |

The cure for the prevulcanized strip can be in a press or in open steam at 270–285° F. for 40 to 60 minutes.

The rubber and copolymer formulations used in the preparation of adhesion test specimens are shown below in the examples. The isobutylene-isoprene copolymer (GR–I copolymer) was prepared by the generally known low temperature Friedel-Crafts polymerization methods for making such copolymers and especially by the procedures as shown in U. S. 2,356,128 to Thomas and Sparks using about 97 weight per cent of isobutylene and about 3 weight per cent of isoprene in the polymerization feed. The procedure for making the butadiene-styrene copolymer rubber (GR–S) is well known to the art. The invention is also highly useful for bonding together the isoolefin-diolefin copolymers and blends of more highly unsaturated rubbery materials such as blends of natural rubber and GR–S.

The invention will be more completely described by the following examples which are presented as representative embodiments of the invention but not with the intention of any limitation thereto.

EXAMPLE I

The stocks employed in this example are shown in Table 2. Adhesion test specimens were prepared as follows:

The natural rubber carcass stock, backed with heavy belting duck, was given an optimum press cure, as shown, to simuluate carcass rubber on a tire which is to be recapped. The total thickness of the carcass sample was 5/64 inch. The unbacked surface of the vulcanizate was roughened with sandpaper. The interposed GR–I tie stock was vulcanized as shown in a press to a thickness of 1/64 inch. Both the top and bottom surfaces of the tie stock were roughened with sandpaper. The GR–I tread stock was slabbed off the mixing mill to a thickness of 5/32 inch. Specimens of the carcass, tread, and tie stock were cut out in strips 5 31/32 x 1 63/64 inch dimensions. The natural rubber cement formulated as shown in Table 1 was applied to the buffed side of the carcass specimen and to one side of the tie stock. After drying for ten minutes, the two cemented surfaces were plied together with a hand roller. The GR–I cement formulated as shown in Table 1 was applied to the other buffed surface of the tie stock and to the unvulcanized GR–I tread. After drying for ten minutes, these two cemented surfaces were also plied together with a hand roller. A strip of heavy belting duck was then laid on top of the tread stock. The test specimen was then placed in a mold with 6 x 2 x 7/32 inch cavity and subjected to press curing to vulcanize the tread and cements into a laminated structure such as shown in the accompanying drawing.

TABLE 2

*Adhesion of GR–1 copolymer to natural rubber-base stocks*

BUTYL TREAD

| | |
|---|---|
| GR–I (15 parts isoprene in feed) | 100 |
| HMF Black (furnace carbon black) | 30 |
| EPC Black (channel carbon black) | 50 |
| Zinc oxide | 5 |
| Hydrocarbon mixture (plasticizer) | 10 |
| Sulfur | 2 |
| Tetramethylthiuram disulfide | 1 |
| Benzothiazyl disulfide | 1 |
| | 199 |

BUTYL TIE STRIP [1]

| | |
|---|---|
| GR–I (25 parts isoprene in feed) | 100 |
| SRF Black (furnace carbon black) | 50 |
| Zinc oxide | 10 |
| Hydrocarbon mixture (plasticizer) | 10 |
| Sulfur | 2 |
| Tetramethylthiuram disulfide | 1 |
| Mercaptobenzothiazole | 0.5 |
| | 173.5 |

NATURAL RUBBER CARCASS [2]

| | Passenger Tires | Truck Tires |
|---|---|---|
| Smoked Sheet | 100 | 100 |
| Age Rite Resin D | 1 | 2 |
| Reogen | 2 | 2 |
| Pine Tar | 1 | 1 |
| Rosin Oil | 1 | 1.5 |
| Stearic Acid | 1 | 1 |
| Zinc Oxide | 3 | 10 |
| Precipitated Whiting | 30 | |
| EPC Black (channel carbon black) | | 10 |
| FT Black (thermal carbon black) | | 25 |
| Sulfur | 2.8 | 3 |
| Mercaptobenzothiazole | 0.8 | |
| Benzothiazyl disulfide | | 0.75 |
| Tetramethylthiuram disulfide | | 0.1 |
| | 142.6 | 156.35 |

[1] Press cure 50' at 274° F.
[2] Press cure 50' at 274° F.

EXAMPLE II

Table 3 contains data obtained in evaluating the bond strength by pulling the specimen apart with a Scott Tester at the rate of 10 inches per minute. The specimen was placed on the machine in such a manner that a tread end was gripped by one jaw and the carcass on the same end of the specimen was gripped by the other jaw. The tie stock in the middle was not attached to either jaw. This arrangement was made possible by inserting a one inch strip of cellophane on both sides of the tie stock at one end of the specimen before curing. The strength of adhesion was obtained in pounds per linear inch. The data shown in regard to the type of separation were visual estimates of the percentage of total failure to the individual components of the specimen.

TABLE 3

*Adhesion data of Example I samples*

[Resistance to stripping at 10 inches per minute]

| | | | | |
|---|---|---|---|---|
| Press Cure of plied structure, Min. at 300° F. | 15 | 30 | 15 | 30. |
| Carcass Type | Passenger | Passenger | Truck | Truck. |
| Adhesion at 77° F.: | | | | |
| Lbs./Linear inch | 45 | 40 | 37 | 47. |
| Type of Separation, percent Cement-Carcass-Tie Strip | 40-60-0 | 20-80-0 | 35-35-30 | 50-50-0. |
| Adhestion at 250° F.: | | | | |
| Lbs./linear inch | 34 | 25 | 15 | 18. |
| Type of Separation, percent Cement-Carcass-Tie Strip | 20-80-0 | 5-90-5 | 35-30-35 | 50-50-0. |

In no case in the above tests did separation occur between the GR–I prevulcanized tie strip and the GR–I tread. Separation occurred between the tie strip and the natural rubber carcass. This separation was due in some spots to a splitting of the natural rubber cement, in other spots to a rupturing of the natural rubber carcass, and in some spots to a rupturing of the tie strip.

As shown in Table 3, the adhesive strength exhibited when the specimens were pulled at 77° F. is very high. Even when the specimens were pulled at the considerably elevated temperature of 250° F. they exhibited good adhesive strength, particularly in the cases where the passenger type carcass was used. The good quality of the cement and tie stock is further shown by an examination of the type of separation data. Thus, it is shown that a much lesser percentage of separation was due to splitting of the cement than was due to a splitting of the passenger carcass. The cement was equally as strong as the truck carcass. The excellent behavior of the tie bond is clearly evident from these data.

EXAMPLE III

The previous Examples I and II show the results obtained when a natural rubber cement especially designed for the adhesion of natural rubber to GR–I rubber was employed. The curatives used were found to give a vulcanization rate comparable to that of the GR–I stocks. The strength and general adhesive characteristics obtained with the type and concentration of filler employed are superior and quite unexpected. Example III shows the results obtained when using a natural rubber cement containing the same curative but with a different filler loading as shown in Table 4.

TABLE 4

| Component: | Parts by weight |
|---|---|
| Smoked sheet | 100 |
| Stearic acid | 1 |
| SRF Black (furnace carbon black) | 25 |
| Zinc oxide | 10 |
| Sulfur | 2 |
| Benzothiazyl disulfite | 1 |
| | 139 |
| Hexane | 825 |
| Bondogen [1] | 2.2 |
| Solids, weight percent | 14.4 |

[1] An oil-soluble sulfonic acid of high molecular weight with a hydrophobic alcohol of high boiling point—used to obtain higher solids content for a given viscosity or a lower viscosity for a given weight of solids.

Except for this different natural rubber cement, the stocks employed, the method of sample preparation, and the testing procedures used were identical with those of Example I. The results of adhesion tests on these samples are shown in Table 5.

TABLE 5

*Adhesion data of Example III samples*

[Resistance to stripping at 10 inches per minute]

| Press Cure of plied structure, Min. at 300° F. | 15 | 30 | 15 | 30. |
|---|---|---|---|---|
| Carcass Type | Passenger | Passenger | Truck | Truck. |
| Adhesion at 77° F.: | | | | |
| Lbs./linear inch | 33 | 28 | 37 | 30. |
| Type of Separation, Percent Cement-Carcass-Tie Strip. | 95-5-0 | 95-5-0 | 50-0-50 | 90-0-10. |
| Adhesion at 250° F.: | | | | |
| Lbs./linear inch | 20 | 16 | 16 | 15. |
| Type of Separation, Percent Cement-Carcass-Tie Strip. | 95-5-0 | 90-5-5 | 90-0-10 | 95-0-5. |

The adhesion characteristics of these samples were not as good as those obtained with the cement used in Examples I and II. This can be seen by comparing the data previously discussed in Table 3 with those in Table 5. The adhesive strength values are less, and most of the separation occurs as a result of cement splitting.

EXAMPLE IV

An essential part of this novel discovery for vulcanizing low unsaturation isoolefin-diolefin copolymers in the presence of natural rubber to form a strong bond between the two rubbers is the use of the intermediate layer of cured GR-I copolymer tie stock. For example, using the GR-I copolymer rubber and natural rubber cements, carcass, and tread stocks shown in Table 2, but without using the GR-I rubber cured tie stock, the following experiments were run:

A. The GR-I cement was applied to both the carcass and tread stocks. After drying for ten minutes the two cemented surfaces were placed together and the specimen was rolled to give even contact. The same total thickness of specimen as in Example I was cured at 300° F. for 10, 15, 30 and 45 minutes in the same mold as the specimens in Examples I and II.

B. Like "A" above except that the natural rubber cement was used in place of the GR-I rubber cement.

C. Like "A" except that the GR-I rubber cement was applied directly to the GR-I copolymer tread stock and the natural rubber cement was applied to the natural rubber carcass stock.

In no case above outlined was a force greater than 8 lbs. per linear inch required to strip the specimens apart with the same test procedure as used in Examples I and II, when the specimens were pulled at 77° F.

To summarize, this invention consists of a unique method for bonding the low unsaturation isoolefin-diolefin copolymers to natural rubber and similar more highly unsaturated rubbery materials whereby both rubbers are adhered to an intermediary strip of prevulcanized GR-I rubber. The resulting bond strength is much greater than heretofore possible without the use of the prevulcanized strip of GR-I rubber. In addition a special natural rubber cement formulation which further enhances the bond strength obtainable has been discovered.

EXAMPLE V

The use of this invention makes possible the construction of a pneumatic tire by bonding together rubbery materials of high and low levels of chemical unsaturation. The tire carcass may be prepared in conventional manner by impregnating and/or calendering natural or synthetic fibers, or even metal wire, with high unsaturation rubbers containing normal constituents such as sulfur, vulcanizing accelerators, fillers, reclaimed rubber, softeners, etc. To this carcass or cushion is applied a tie gum or cement prepared as described above for the natural rubber surface.

The tread and sidewall can be prepared for tire building by extrusion or calendering operations according to techniques well known in the art from a low unsaturation rubber prepared predominantly from isobutylene and a conjugated diolefin such as isoprene or butadiene, also containing normal constituents, curatives, softener, filler, etc. The surface of the isobutylene-diolefin copolymer which is to contact the cushion or tire casing prepared using high diolefin rubber may be coated with cement prepared as described above from the GR-I copolymer. The tire parts with the appropriate cements are joined together with the above described interposed prevulcanized ply of GR-I copolymer and the resulting laminated tire may then be vulcanized in customary manner.

EXAMPLE VI

Alternatively, the invention may be utilized for the application to various structures having jackets made up of the low unsaturation isobutylene-diolefin copolymer material which is highly resistant to oxidation by ozone, air, or other reactants and highly resistant to sunlight, ultraviolet light and heat, as well as highly resistant to flexure, abrasion, and other mechanically destructive influences. Articles in which this type of structure is particularly advantageous are pneumatic tires as above described; cables in which an insulation of natural rubber, either new or reclaimed, is protected by a jacket of the copolymer held in place by an intervening strip of the prevulcanized copolymer; belts either for the transmission of power or conveyor belts, in which a fabric carcass impregnated with rubber is protected by a jacket of polymer in which instance the combination is particularly advantageous because of the high strength and high abrasion resistance of the polymer. This invention also makes possible the recapping of previously vulcanized natural rubber tire casings with treads made from the low unsaturation copolymer materials which have high abrasion resistance.

What is claimed is:

1. An article of manufacture comprising a first body of a low temperature interpolymer of a major amount of isobutylene with a minor proportion of a conjugated diolefin, the interpolymer being characterized by a low unsaturation within the range of an iodine number between 0.5 and 50, a molecular weight above 20,000 and reactivity with a curing agent to yield an elastic product, a cement layer of the same interpolymer adherent to one side thereof and having substantially the following composition:

| | Parts by weight |
|---|---|
| Low unsaturation interpolymer | 100 |
| Furnace carbon black | 25–50 |
| Zinc oxide | 5–10 |
| Sulfur | 2–3 |
| Accelerator A | 0.5–2.0 |
| Accelerator B | 0.5–1.0 | accelerator A being a material selected from the group consisting of tetramethyl thiuram disulfide and tellurium diethyl dithiocarbamate, and accelerator B being a material selected from the group consisting of benzothiazyl disulfide and mercaptobenzothiazole; a second body of a rubbery material, characterized by a high unsaturation within the range of an iodine number between 50 and 451, and reactivity with a curing agent; a cement layer of the same rubbery material adhered thereto and having substantially the following composition:

| | Parts by weight |
|---|---|
| High unsaturation rubber | 100 |
| Stearic acid | 0.5–1.0 |
| Bentonite | 0–15 |
| Carbon black | None |
| Zinc oxide | 5–10 |
| Sulfur | 1.8–3.0 |
| Accelerator B | 1.2–0.8 | accelerator B being a material selected from the group consisting of benzothiazyl disulfide and mercaptobenzothiazole; and a third, interposed body adhered on one side to the low unsaturation cement and adhered on the other side to the high unsaturation cement, said interposed body comprising a compounded and prevulcanized ply strip of the same low unsaturation interpolymer as the said first body, and having substantially the following composition:

| | Parts by weight |
|---|---|
| Low unsaturation interpolymer | 100 |
| Carbon black selected from the group: | |
|   SRF Carbon black | 45–55 |
|   HMF Carbon black | 40–50 |
| Hydrocarbon mixture (plasticizer) | 5–15 |
| Sulfur | 2–3 |
| Tetramethyl thiuram disulfide | 1–2 |
| Accelerator B | 0.5–1 | accelerator B being a material selected from the group consisting of benzothiazyl disulfide and mercaptobenzothiazole; said pre-vulcanized interposed ply strip having been cured at about 270–285° F. for about 40–60 minutes, to produce sufficient vulcanization that said ply strip may be buffed and sufficient so that the high unsaturation rubber adjacent thereto can not prevent it from vulcanizing adequately, but said pre-vulcanization being somewhat less than to an optimum cure; said triply laminated structure, bonded with said low and high unsaturation cement layers, being vulcanized together.

2. An article of manufacture according to claim 1 in which the said second body is a diene-styrene interpolymer.

3. An article of manufacture according to claim 1 in which the said second body is natural rubber.

4. An article of manufacture according to claim 1 in which the said second body is a blend of a diene-styrene interpolymer and natural rubber.

5. An article of manufacture according to claim 1 in which the said first body and the said interposed third body are an interpolymer of a major proportion of isobutylene with a minor proportion of butadiene.

6. An article of manufacture according to claim 1 in which the said first body and the said interposed, third body are an interpolymer of a major proportion of isobutylene with a minor proportion of isoprene.

7. An article of manufacture according to claim 1 in which the said first body and the said interposed, third body are an interpolymer of about 97 weight per cent of isobutylene and about 3 weight per cent of isoprene.

References Cited in the file of this patent

UNITED STATES PATENTS

| | | |
|---|---|---|
| 2,037,749 | Anderson | Apr. 21, 1936 |
| 2,101,607 | Block | Dec. 7, 1937 |
| 2,269,712 | Drew | Jan. 13, 1942 |
| 2,392,590 | Hulswit et al. | Jan. 8, 1946 |
| 2,399,558 | McArdle | Apr. 30, 1946 |
| 2,483,754 | Clifton | Oct. 4, 1949 |
| 2,583,387 | Morrissey et al. | Jan. 22, 1952 |